US009143817B2

(12) United States Patent
Ernst et al.

(10) Patent No.: US 9,143,817 B2
(45) Date of Patent: Sep. 22, 2015

(54) METHOD AND DEVICE FOR TRANSMITTING DECRYPTION CODES OF FREELY TRANSMITTED, ENCRYPTED PROGRAM CONTENTS TO CLEARLY IDENTIFIABLE RECEIVERS

(75) Inventors: Matthias Ernst, München (DE); Jens Specht, Koetz (DE)

(73) Assignee: BT (GERMANY) GmbH & Co. OHG, Munich (DE)

( * ) Notice: Subject to any disclaimer, the term of this patent is extended or adjusted under 35 U.S.C. 154(b) by 2727 days.

(21) Appl. No.: 10/563,230

(22) PCT Filed: Jul. 5, 2004

(86) PCT No.: PCT/EP2004/007332
§ 371 (c)(1),
(2), (4) Date: Jun. 23, 2006

(87) PCT Pub. No.: WO2005/004484
PCT Pub. Date: Jan. 13, 2005

(65) Prior Publication Data
US 2006/0271483 A1 Nov. 30, 2006

(30) Foreign Application Priority Data
Jul. 3, 2003 (DE) .................................. 103 30 089

(51) Int. Cl.
*G06F 21/00* (2013.01)
*H04N 21/266* (2011.01)
(Continued)

(52) U.S. Cl.
CPC ......... *H04N 21/26613* (2013.01); *H04N 7/165* (2013.01); *H04N 21/2543* (2013.01); *H04N 21/25816* (2013.01); *H04N 21/6187* (2013.01); *H04N 21/63345* (2013.01)

(58) Field of Classification Search
USPC ................................................ 705/50–79, 52
See application file for complete search history.

(56) References Cited

U.S. PATENT DOCUMENTS 4,763,191 A * 8/1988 Gordon et al. ................ 725/104
4,807,023 A * 2/1989 Bestler et al. ................ 725/104
(Continued)

FOREIGN PATENT DOCUMENTS

DE           37 17 261 A1    11/1987
DE           198 05 409 A1    8/1999
(Continued)

OTHER PUBLICATIONS
White, "How Computers Work", Millennium Edition, 1999, Que Corporation, Indianapolis, IN, all pages.*
(Continued)

*Primary Examiner* — Jacob C. Coppola
(74) *Attorney, Agent, or Firm* — Westerman, Hattori, Daniels & Adrian, LLP

(57) ABSTRACT

The invention relates to a method and to a device for transmitting decryption codes for freely transmitted, encrypted program contents, enabling decryption codes to be transmitted in a more simple manner and enabling a connection or a user to be established via a user network, also enabling the reception of a telephone call, identification of the network termination element, especially the telephone number, and transmission of the decryption code for a program content. Billing data can be automatically established using the network termination element/the telephone number and information on the requested program content. Additionally or alternatively, examination is possible if a registered right of access for the decryption code exists for the network termination element/telephone number, whereby transmission occurs exclusively for the existing right of access. The invention also relates to a system for decrypting freely transmitted, encrypted program contents.

12 Claims, 1 Drawing Sheet

Figure 1:
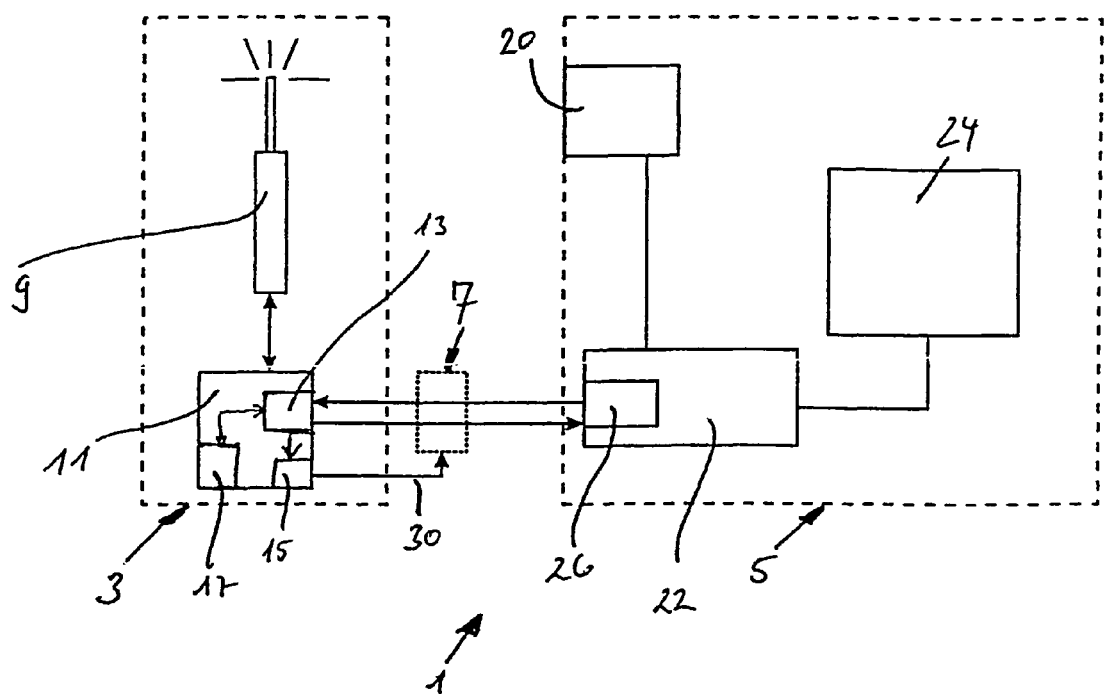

(51) Int. Cl.
*H04N 7/16* (2011.01)
*H04N 21/2543* (2011.01)
*H04N 21/258* (2011.01)
*H04N 21/61* (2011.01)
*H04N 21/6334* (2011.01)

(56) References Cited

U.S. PATENT DOCUMENTS

| | | | | |
|---|---|---|---|---|
| 4,890,322 | A | * | 12/1989 | Russell, Jr. .................... 380/231 |
| 5,400,403 | A | * | 3/1995 | Fahn et al. ....................... 705/51 |
| 5,537,292 | A | * | 7/1996 | Bowen ........................... 361/737 |
| 5,563,946 | A | * | 10/1996 | Cooper et al. .................. 705/56 |
| 5,592,551 | A | | 1/1997 | Lett et al. |
| 5,613,191 | A | * | 3/1997 | Hylton et al. ................... 725/81 |
| 5,625,690 | A | * | 4/1997 | Michel et al. .................... 705/53 |
| 5,642,418 | A | * | 6/1997 | Farris et al. .................... 380/211 |
| 5,794,115 | A | | 8/1998 | Saito |
| 5,812,667 | A | * | 9/1998 | Miki et al. ..................... 380/249 |
| 6,044,155 | A | * | 3/2000 | Thomlinson et al. .......... 380/277 |
| 6,137,885 | A | * | 10/2000 | Totaro et al. .................. 380/247 |
| 6,185,681 | B1 | * | 2/2001 | Zizzi .............................. 713/165 |
| 6,226,618 | B1 | * | 5/2001 | Downs et al. ..................... 705/1 |
| 6,373,948 | B1 | * | 4/2002 | Wool .............................. 380/241 |
| 6,553,110 | B1 | * | 4/2003 | Peng ......................... 379/210.03 |
| 6,674,858 | B1 | * | 1/2004 | Kimura et al. ................. 380/239 |
| 2002/0166047 | A1 | * | 11/2002 | Kawamoto ..................... 713/169 |
| 2002/0169971 | A1 | * | 11/2002 | Asano et al. ................... 713/193 |
| 2003/0030751 | A1 | | 2/2003 | Lupulescu et al. |
| 2003/0081785 | A1 | * | 5/2003 | Boneh et al. .................. 380/277 |
| 2005/0066364 | A1 | * | 3/2005 | Rambo ........................... 725/43 |
| 2006/0212399 | A1 | * | 9/2006 | Akiyama ........................ 705/50 |

FOREIGN PATENT DOCUMENTS

| | | |
|---|---|---|
| DE | 198 46 452 A1 | 12/1999 |
| DE | 199 38 201 A1 | 2/2001 |
| DE | 100 55 237 A1 | 5/2002 |
| DE | 100 55 243 A1 | 5/2002 |
| EP | 0676 897 A2 | 10/1995 |
| WO | 99/30293 A2 | 6/1999 |
| WO | 02/019612 A2 | 3/2002 |

OTHER PUBLICATIONS

Derfler, "How Networks Work", Bestseller Edition, 1996, Ziff-Davis Press, Emeryville, CA, all pages.*

Gralla, "How the Internet Works", Millennium Edition, 1999, Que Corporation, Indianapolis, IN, all pages.*

Muller, "Desktop Encyclopedia of the Internet", 1999, Artech House Inc., Norwood, MA, all pages.*

Strunk et al., "The Elements of Style," Third Edition, 1979, MacMillan Publ. Co., Inc., New York, NY, all pages.*

"Functional Model of a conditional Access System" EBU Review—Technical, European Broadcasting Union, Brussels, BE, No. 266, Dec. 21, 1995, pp. 64-88, XP000559450, ISSN: 0251-0936 (14 pages).

* cited by examiner

METHOD AND DEVICE FOR TRANSMITTING DECRYPTION CODES OF FREELY TRANSMITTED, ENCRYPTED PROGRAM CONTENTS TO CLEARLY IDENTIFIABLE RECEIVERS

The present invention relates to a method and a device for transmitting decryption codes for freely transmitted encrypted program contents to clearly identifiable receivers.

It is known for certain program contents, such as for example pay-TV programs, to be broadcast in encrypted form. These program contents are broadcast, for example, via satellites, cable, or in another manner. In this form of free broadcast, the one-way information transmission means that certain persons, who for example do not pay any fee for received services, are not excluded from receipt of the program contents. In order nonetheless to achieve financing of these program contents, they are encrypted in a known manner and the customer is sold decryption codes in chip cards, for example, which make a proper display of the program contents dependent on the possession of a valid chip card.

However, as has happened in the past, the decryption code of such chip cards can be bypassed or cracked, so that it can be passed on to unauthorized third parties, who pay no charges to the providers of the program contents. This makes it more difficult to finance such program contents, as an effective restriction of access to freely broadcast program contents is not possible.

The established method nowadays for pay-TV users involves a registration of the subscribers and the transfer of a code for decrypting the programs to a specific group of registered subscribers. To retrieve the program contents, which must usually be paid for, the registered subscriber needs special facilities for reception of satellite and broadband data (program access code and program) as well as a unit for decoding the data stream, e.g. a decoder with a decryption unit. A corresponding decryption code is supplied in a chip card, which causes the aforementioned problems, in particular the problem of a transfer of the decryption code to non-registered and thus non-paying users. In addition, a change to the encryption is very costly, as the respective registered users have to be supplied with a new decryption code via a corresponding chip card.

As well as the chip card problems, there is further the problem that the authorized subscribers must each be registered at some expense, and in general they must be charged a monthly fee for being able to view the program contents, this being independent of actual use. This leads many potential pay-TV customers to avoid any actual participation. In addition, because of this resistance and the aforementioned reasons, it is very difficult for further providers of program contents to enter the market.

Starting from the aforementioned method, the present invention is therefore based on the object of providing a simplified device and a simplified method for transmitting decryption codes for freely transmitted encrypted program contents. The access to encrypted program contents and the billing for this should furthermore be simplified.

According to the invention, a method is provided for transmitting decryption codes for freely transmitted encrypted program contents and for automatically establishing billing data for the program contents, in which a connection is first established via a user network of a customer who wishes to access an encrypted program content, the network terminating unit (terminal) in particular a calling party number is identified, the decryption code for a program content is transmitted, and finally billing data using the identified network terminating unit (terminal) in particular the calling party number and information about the requested program contents are established. This connection is preferably established through the acceptance of a telephone call. In the method according to the invention, the identification possibility for network terminating units, which is customary and unique in subscriber networks and in particular in telecommunication, such as e.g. telephone numbers in PSDN or means of identification in GSM or mobile radio networks, as well as IP addresses in IP networks optionally also in combination with telephone numbers, is used for sending the decryption code for the person- or connection-related decryption of certain program contents over such a connection, and making it available for reception to the user thereby identified. This method also enables a simple transmission of decryption codes for program contents to clearly identified users without the need for a chip card. Based on this simple transmission of decryption codes it is possible to alter the encryption or encryption systems for the program contents regularly, as a new decryption code can be retrieved each time in a simple manner. For example, successively broadcast movies can each be differently encoded, and a user can retrieve a decryption code for each individual movie. This significantly increases the security against an unauthorized usage by third parties, as passing on the decryption codes to unauthorized users is made much more difficult with a more frequent change of the encryption or the encryption systems. In addition, it is possible to enable usage-dependent billing without prior registration. Thus for example the decryption code for a single movie can be retrieved and charged. This on the one hand facilitates the entry of such program content providers, and on the other hand lowers the inhibition level for the relevant user, who balks at registration and the flat-rate billing of the previously established method.

In the aforesaid method, at least one additional identification feature is preferably retrieved from the caller during the period of the connection, in particular of the telephone call, and before the transmission of the decryption code. The query can be used, for example, to exclude the transmission of the decryption code to unauthorized users. For this, the validity of the identification features is preferably checked, and the decryption code transmitted only in the case of validity. Conceivable additional identification features are for example an age-related or personal identification code and/or an identification or device number of a decoder receiving the decryption code. The age-related or personal identification code can be used for example to allow access to program contents with age restrictions, such an identification code being issued for example only to persons of a certain age group, e.g. over 18 years. The retrieval of the identification or device number of a decoder receiving the decryption code enables for example a check of whether this is a legally obtained device. The query can also return information for a loyalty/discount program.

It is also possible in an embodiment of the invention that the decryption code is generated specifically for the identified decoder and transmitted to this. On the one hand this can imply that decoders, depending in each case on their identification or device number, contain an internal decryption code, which enables successful decryption only in combination with the decryption code generated specifically for this. This would make it significantly more difficult for the decryption code to be passed on, as it would have to be adapted for the next decoder. In addition, however, information about the receiving decoder can easily be included in the decryption code, so that in the event of an unauthorized disclosure of the decryption code, the origin of the code can be determined. In this context it is also possible in an embodiment of the invention to incorporate information about the calling party number in the transmitted decryption code, in order to determine the origin of the decryption code in the event of an unauthorized disclosure.

If different program contents are supplied via a called telephone number, the program content for which the decryption code is to be sent is preferably queried before the transmission of the decryption code.

To simplify proper billing, at least one of the following items of information for the billing data is additionally stored, or forwarded to a corresponding billing unit: the called number, the time and/or duration of the telephone connection, the additional identification features and/or the transmitted decryption code. These items of information enable a detailed breakdown of the billing data for the user, and could serve as a voucher and/or statement for the delivery of the service, such as was previously not possible.

In an especially preferred embodiment, the billing data is forwarded for collection to the telecommunication service provider via which the call was made. This method enables billing for the user anonymously in relation to the program content provider. In addition, this method considerably simplifies the effort for billing on the program content provider's side, and is especially suitable for billing smaller amounts, for example when individual limited program contents are retrieved. Here the called number is preferably a chargeable service number, which is billed via the telecommunication service provider.

The object according to the invention is also achieved with a method for transmitting to a registered customer or subscriber group decryption codes for encrypted program contents that can be freely transmitted, wherein a connection is established via a subscriber network of a customer, in particular a telephone call is received, the network terminating unit (terminal) is identified, e.g. a telephone line is checked using the calling party number to see whether there is a registered access right to the requested decryption code for the network terminating unit, and the decryption code is transmitted if the access right exists. This method is especially suitable as an improvement for the previously established method, in which a registered subscriber group is present, which for example also uses a flat-rate billing system. Because of the relatively simple transmission of the decryption code, independent of a chip card, the program content provider is enabled to change the encryption for the program contents more frequently.

For example, the encryption codes and/or systems can be altered at irregular or fixed time intervals, for example daily or weekly, making cracking of the code and unauthorized disclosure to third parties much more difficult. It is naturally also possible to have usage-specific billing for the registered subscriber group, independent of a flat-rate method.

As well as the identified network terminating unit or the calling party number, at least one additional identification feature is preferably retrieved from the customer, and its validity is preferably checked. This yields the advantages already mentioned above. Here the additional identification feature preferably includes at least one age-related or personal identification code and/or an identification code of a decoder receiving the decryption code. For example, the decryption code can be created specifically for the receiving decoder. In this embodiment too, the decryption code can for example include information about the calling party number, in order to determine the origin of the decryption code in the event of unauthorized forwarding to third parties.

If different program contents are supplied via a called call number, the program content for which the decryption code is needed is preferably queried before the transmission of the decryption code.

In an embodiment of the invention, the calling party numbers and information relating to the program contents for which the decryption code was transmitted are stored, and/or forwarded to an appropriate unit for billing purposes. Preferably at least one of the following additional items of information can be stored and/or forwarded for billing purposes: The called number, the time and/or duration of the telephone call, the additional identification features and/or the transmitted decryption code.

The underlying object of the present invention is also achieved with a device for transmitting decryption codes for freely transmitted encrypted program contents and for automatic billing of the same, wherein the device has a unit for establishing a connection over a subscriber network of a customer, in particular a telephone unit for receiving telephone calls, a unit for determining the network terminating unit (terminal), in particular the calling party number of the customer, a unit for transmitting the decryption code and a unit for storing and/or forwarding billing data, consisting of the network terminating unit (terminal), in particular the calling party number and information about the program contents, for which the decryption code was transmitted. Such a device enables a simple transmission of decryption codes for encrypted program contents, as well as simple billing for this transmission. A comparator unit is preferably provided for comparing an entered code with a stored authorization code, which corresponds for example to the previously mentioned identification features.

The object is further achieved with a device for transmitting decryption codes for freely transmitted encrypted program contents to a registered subscriber group, the device having a unit for establishing a connection over a subscriber network of a customer, in particular a telephone unit for receiving telephone calls; a unit for detecting the network terminating unit (terminal), in particular the calling party number of the customer; a memory unit for storing a registered subscriber group with its respective network terminating unit (terminal) or its calling party numbers; a unit for comparing the identified network terminating unit (terminal), in particular the identified calling party numbers with the registered data and a unit for transmitting the decryption code.

The underlying object of the present invention is also achieved with a system for decrypting freely transmitted encrypted program contents, which has a receiver unit for receiving the program content, a unit for establishing a connection over a subscriber network of a customer, in particular a telecommunication connection, with a decryption code transmission unit, a memory for storing a decryption code transmitted over the connection, and a decoder. This system enables a simple and quick retrieval of decryption codes for corresponding program content providers. The system preferably has a memory for storing information for the connection setup, in particular a telephone number to be called, in so far as this is a fixed call number. Alternatively and/or additionally, the system preferably has a unit for input of information for the connection setup, in particular a telephone number to be called and/or additional information.

In an especially preferred embodiment the system has an error detection unit, which detects whether the stored decryption code correctly decodes a desired program content. A corresponding error message can hereby be provided, or the code retrieval can automatically be repeated. This is especially advantageous with registered subscribers with flat-rate billing, as no additional costs arise from the automatically repeated query and thus there is no cost risk for the user from the automatic retrieval function. In a further embodiment of the invention, the system includes a unit for automatic setup of a connection and for retrieval of a decryption code at preset times. This is especially appropriate if the system is used in connection with a registration and flat-rate billing, in order to keep a corresponding decryption code available at any time for a corresponding change of the encryption code at a preset time. These preset times can either be specified by time intervals, such as daily or weekly retrievals for example, or the time can be preset by the activation of the unit. For example, there can be an automatic query of the decryption code each time the unit is activated. Naturally, a combination of these is also possible.

The unit for establishing a telecommunication connection, the memory for storing the decryption code, the memory for storing information for the connection setup, in particular a telephone number to be called, the input unit and/or the error detection unit are preferably integrated in the decoder.

Figure 2:
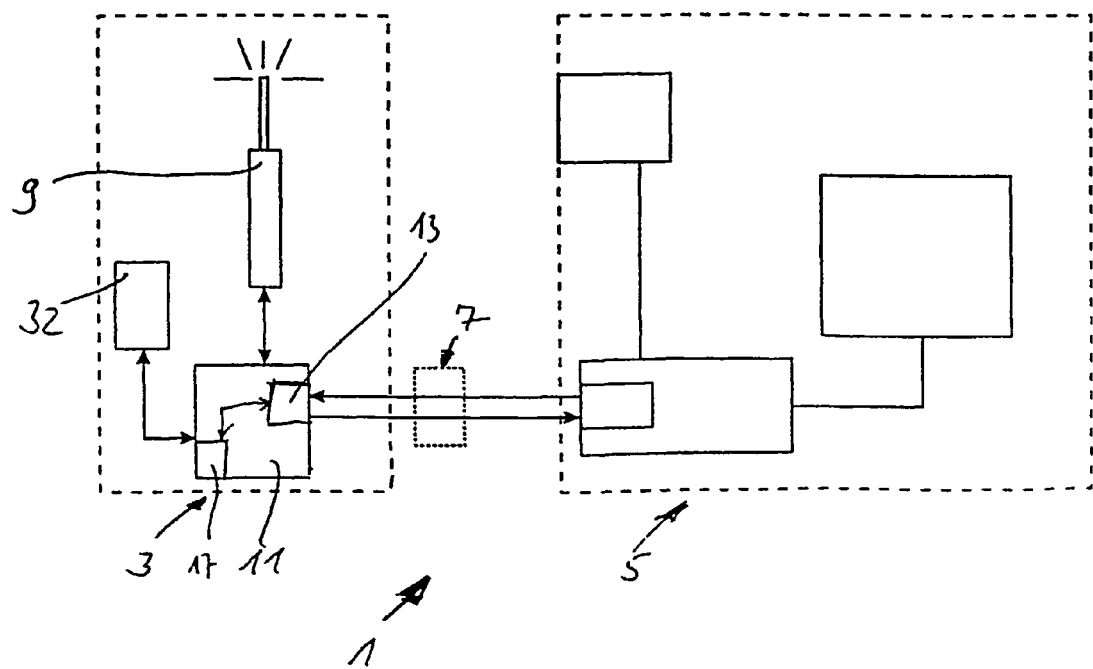

The present invention will now be further described in detail on the basis of preferred embodiments of the invention with reference to the drawings; shown in the drawings are:

FIG. 1 a schematic representation for the broadcasting of encrypted program contents and for the transmission and receipt of decryption codes for the program contents according to a first embodiment of the invention;

FIG. 2 a schematic representation for the broadcasting of encrypted program contents and for the transmission and receipt of decryption codes for the program contents according to a second embodiment of the invention.

FIG. 1 schematically shows a system 1 for the broadcasting of encrypted program contents and for the transmission of decryption codes for these. The system 1 contains an area 3 of a program content provider, an area 5 of a user of the program contents and an area 7 of a telecommunication service provider.

In the program content provider's area 3, a send unit 9 and a code unit 11 are provided. The send unit 9 is in communication contact with the code unit 11, and is used for free broadcasting of encrypted program contents. The term "broadcast" here implies any one-way information transmission, for example over terrestrial antennas, satellites or a line-connected transmission, for example over cable connections. The communication link between the send unit 9 and the code unit 11 is used for transmission of the encryption code broadcast with the program contents. This can for example be preset by the code unit 11 of the send unit, or the send unit forwards the currently used encryption code or a corresponding decryption code to the code unit 11.

The code unit 11 includes a corresponding communication module, which is not shown in detail, for communication with the send unit 9. The code unit 11 further has a communication unit 13 for receiving telephone calls switched by the telecommunication service provider 7. The communication unit 13 or a separate unit is further able to identify the calling party number of an incoming call, and to transmit a requested decryption code. The code unit 11 further has a unit 15 for storing and/or forwarding billing data, consisting of the established calling party number and information relating to the program contents for which the decryption code was transmitted. A corresponding communication link is provided for this between the units 13 and 15. The units 13 and 15 can naturally also be integrated in a single unit.

The unit 13 is further suitable for receiving other information from a caller. The code unit 11 further has a comparator unit 17, which compares received information with previously stored information, and decides on the basis of this comparison whether a decryption code is transmitted to a caller or not.

Although in FIG. 1 the code unit 11 is shown as being in the area of the program content provider 3, the code unit 11 or individual parts of it could be in the telecommunication service provider's area 7.

The user area 5 has a receiver unit 20 for receiving the broadcast program content, such as a satellite dish or an antenna or a cable connection, a decoder 22 for decrypting the program contents and a unit 24 for displaying and/or recording the program contents, such as a television for example. In addition, a unit 26 for establishing a telecommunication connection with the code unit 11 is provided, as well as a memory for storing a decryption code transmitted over the telecommunication connection. The unit 26 is for example a modem integrated in the decoder 22. Alternatively, an external modem can naturally also be provided. The memory for storing the decryption code is preferably likewise provided in the decoder 22. Alternatively, however, the memory can also be provided externally, so long as the decoder 22 can access the decryption code. For example, rewritable storage cells can be written in a separate recording device and then connected to decoder 22.

The user area 5 can be developed both as stationary in a normal household and also as mobile. Thus the individual components can for example be in a trailer, and the necessary establishing of a connection to the program content provider can take place via a mobile radio connection (wireless), for example.

The function of the system 1 is now explained in more detail with reference to FIG. 1. Via the send unit 9, encrypted program contents are broadcast, it being possible for several program contents each with different encryptions to be broadcast in parallel and/or sequentially. In the code unit 11, decryption codes are held ready for the encrypted program contents. It is possible for decryption codes to be held ready both for currently broadcast program contents and also for program contents to be broadcast in the future. Naturally, it is also possible to hold ready only a single decryption code for a single program content.

If a user now wants to display encrypted program content on his television 24, he needs a corresponding decryption code for this, to enable the decoder 22 to decrypt the incoming encrypted signal appropriately for display on the television 24. To find out the decryption code, a switched telecommunication connection to the unit 13 in the code unit 11 is therefore established via the unit 26 and a telecommunication service provider 7. This connection can be made for example via a service number of the telecommunication service provider 7. After receipt of the telephone call at the unit 13, this determines the calling party number from which it was called, and after successfully determining this it sends a decryption code back via the telecommunication link to the unit 26. The unit 26 receives the decryption code and this is stored in a suitable manner for use by the decoder 22. After the decryption code is determined, the telecommunication link is terminated. The decoder 22 is now able to represent encrypted program content received via the receiver unit 20, for ordinary display on the television 24.

In the code unit 11, billing data is created in the unit 15 with the established calling party number and information about the program contents for which the decryption code was transmitted, and forwarded via a corresponding communication link 30 to the telecommunication service provider 7 for collection.

The above functional description explains only a basic concept of one use of the system 1; it can be changed in many respects without deviating from the basic idea of the invention. For example, it is not necessary to forward the billing data to the telecommunication service provider 7 for collection. Instead the program content provider could also arrange invoicing directly based on the billing data. The information contained in the billing data relating to the program contents, for which the decryption code is included, can be presented in many different ways. For example, this information can be contained in the called number, as for example the service number. For example, the unit 13 could take calls for different service numbers and issue a corresponding decryption code depending on the service number. Naturally, the billing data can also include other additional information, which can also in turn at least partially provide information about the requested program content. Such information in particular is the time and/or duration of the telephone connection and/or the transmitted decryption code.

As well as determination of the calling party number by the unit 13, it can further be useful and/or necessary to obtain additional information about the caller before transmitting the decryption code. For this, for example, a corresponding input unit can be provided on the unit 26, which also involves, for example, the input of a call number to be called. This is preferably input from a keyboard on the decoder or a corresponding remote control of the decoder. Naturally, the connection setup as well as the input of additional information can be executed using any suitable interactive terminal device, for example a telephone.

The additional information about the caller includes for example an age-related or personal identification code or an identification or device number of the decoder 22. This additional information can be in any form, for example a numeric code, which can be transmitted in a clearly identifiable manner over the telecommunication link. This additional information is received at the unit 13 and compared in the comparator unit 17 with stored information, and the requested decryption code is released and transmitted only if the received information correspondingly agrees with stored information. If for example the identification or device number of the decoder 22 is queried, this information can be provided automatically by the decoder.

Using the identification or device number of the decoder, a decryption code specifically suitable for the decoder can be generated and transmitted, for example.

For example, it is possible that each decoder contains a source code which is identifiable by the identification or device number and which in combination with the transmitted decryption code enables successful decoding. This source code could be stored on a non-overwritable storage medium. If the same decryption code were combined in a decoder with a different source code, on the other hand, a successful decoding of the encrypted program contents would not be possible, which would make unauthorized passing on or disclosure of the decryption code pointless. Additionally or alternatively however, the decryption code could also easily contain information about the identified decoder and/or the established calling party number—which is not necessary for the decryption of the encrypted program contents—in order to determine the origin of the decryption code in the event of its unauthorized disclosure.

The data additionally received at the receiver unit 13 can likewise be stored or forwarded for the billing data.

FIG. 2 shows an adapted system 1, the same reference numerals being used in FIG. 2 in so far as the same or equivalent elements are provided. The system 1 again has an area 3 of a program content provider, an area 5 of a user and an area 7 of a telecommunication service provider. In the area 3, a send unit 9 and a code unit 11 are provided. In addition, a database 32 is provided, in which information on a registered subscriber group is held. Instead of keeping the data in an external database 32, it is naturally also possible to hold the data ready within the code unit 11 or otherwise.

Although in FIG. 2 the code unit 11 and the database 32 are shown as being in the area of the program content provider 3, the code unit 11, the database 32 and/or individual parts of these could be in the telecommunication service provider's area 7.

The system essentially works in a similar manner to the previously described system, encrypted program content initially being broadcast via the send unit 9. When a user wants to display/record the program contents on a reproduction unit 24, a telecommunication link is in turn established via a provider 7 to the code unit 11. Within the code unit 11, the calling party number is determined, and it is then queried in the database 32 whether there is a registered access right to the decryption code for this calling party number. If the access right exists, the decryption code is transmitted and the decoder 22 is enabled to display the encrypted program content in a proper manner. In this system, a prior registration specifying the calling party number is thus necessary. This system can be used in particular, for example, in a situation in which registered users pay flat-rate usage fees, but a regular change to the encryption code makes it necessary to repeat the retrieval regularly. It is possible here for example that the decoder 22 initiates such a query after predetermined time intervals or upon each activation operation. It is also possible that the decoder 22 includes an error detection unit, which establishes whether the encrypted signal was properly decoded with the stored decryption code, and in the event of an error message automatically outputs a corresponding signal, or automatically initiates a repeat query of the decryption code.

Naturally, the system can also be used in combination with usage-dependent billing of the registered subscribers.

In addition to the checking of an access authorization by means of the calling party number, additional information can also be retrieved as in the preceding embodiment, and used in a corresponding manner.

If different decryption codes can be retrieved for different program contents from the called number, a transmission of information about the desired program contents from the user must also be possible, for example. Such information can be input, for example, from a keyboard of the decoder, or from its remote control. Naturally, the connection setup as well as the input of additional information can again be executed using any suitable interactive terminal device, for example a telephone.

The previously described system or its function thus enables a connection-related transmission of decryption codes for freely broadcast encrypted program contents. The connection in turn enables corresponding billing to the user and a precise identification of the user. As previously described, additional information about the user can be retrieved, if this is necessary. In particular, for program contents that are subject to an age restriction, it is possible to retrieve an identification code that is only issued to those in a specific age group. Such identification codes can also be provided to specific groups of persons, such as members of a company, students etc., to ensure that a decryption code for a specific encrypted program content is supplied only to them.

If the dial-in number for retrieving the decryption code is a service number, a usage-dependent fee can be collected via the telephone bill, for example, without registering the respective user by name. This is especially of interest for new program content providers, as they can make program contents available at once without prior registration of users, and a corresponding payment for the program contents is ensured provided there is usage. The program contents can be identified by the call number to be dialed, or alternatively specified on an existing telecommunication link. The selection of the program contents, the period and/or the duration for which a decryption is necessary, can be made via the dial-in number. It can even optionally specify information in the printout of a telephone bill, or alternative billing options.

Although the invention has been described on the basis of preferred embodiments, it is not restricted to the embodiments actually presented. The features of the different embodiments can be freely combined and/or exchanged with one another, in so far as they are compatible with one another.

The invention claimed is:

1. A method for transmitting decryption codes for freely transmitted encrypted program contents and for automatically establishing billing data for the program contents, comprising:
   a customer receiving encrypted program content from a broadcast source;
   connecting the customer to a service provider via the customer's subscriber network, by placing a telephone call;
   determining a network terminating unit of the existing connection to the service provider, and a calling party number of the customer and a called number of the service provider;
   integrating information about the identified calling party number into a decryption code for a program content;
   transmitting the decryption code for a program content to the customer; and
   establishing billing data using the network terminating unit, in particular the calling party number, the called number of the service provider, and information about the requested program content;
   wherein the program content data is transmitted through a different medium than the decryption code and wherein the decryption code is transmitted through a telephone line.

2. The method according to claim 1, wherein the connecting the customer to the provider is executed by the dialing of a call number of the service provider and the acceptance of the telephone call by the service provider.

3. The method according to claim 1, wherein at least one additional identification feature is retrieved from the caller during the period of the telephone call and before the transmission of the decryption code.

4. The method according to claim 3, wherein the validity of the identification features is checked, and the decryption code is transmitted only in the case of validity.

5. The method according to claim 3, wherein the additional identification features include at least one of the following:
   an age-related or personal identification code, an identification or device number of a decoder receiving the decryption code.

6. The method according to claim 4, wherein the decryption code is generated specifically for an identified decoder and transmitted to the identified decoder.

7. The method according to claim 1, wherein the program content for which the decryption code is to be sent is queried before the transmission of the decryption code.

8. The method according to claim 1, wherein at least one of the following items of information is stored for the billing data, or forwarded to a corresponding billing unit: the called number, the time and/or duration of the telephone connection, the additional identification features and/or the transmitted decryption code.

9. The method according to claim 1, wherein the billing data is forwarded to the telecommunication service provider for collection.

10. The method according to claim 1, wherein the called number is a service number, which is billed via the telecommunication service provider.

11. A method for transmitting decryption codes for freely transmitted encrypted program contents and for automatically establishing billing data for the program contents, comprising:
    receiving encrypted program content from a broadcast source;
    connecting a customer to a service provider via the customer's subscriber network, by placing a telephone call;
    determining a network terminating unit of the existing connection to the service provider, and a calling party number of the customer and a called number of the service provider;
    integrating information about the identified calling party number into a decryption code for a program content;
    transmitting the decryption code for a program content to the customer; and
    establishing billing data using the network terminating unit, in particular the calling party number, the called number of the service provider, and information about the requested program content;
    wherein the program content data is transmitted through a different medium than the decryption code, wherein the broadcast source is a line-connected transmission source and wherein the decryption code is transmitted through a telephone line.

12. A method for transmitting decryption codes for freely transmitted encrypted program contents and for automatically establishing billing data for the program contents, comprising:
    receiving encrypted program content from a broadcast source;
    connecting a customer to a service provider via the customer's subscriber network, by placing a telephone call;
    determining a network terminating unit of the existing connection to the service provider, and a calling party number of the customer and a called number of the service provider;
    integrating information about the identified calling party number into a decryption code for a program content;
    transmitting the decryption code for a program content to the customer; and
    establishing billing data using the network terminating unit, in particular the calling party number, the called number of the service provider, and information about the requested program content;
    wherein the program content data is transmitted through a different medium than the decryption code, wherein the broadcast source is an over-the-air broadcast source and wherein the decryption code is transmitted through a telephone line.

* * * * *